United States Patent [19]

Johnson et al.

[11] Patent Number: 4,873,692
[45] Date of Patent: Oct. 10, 1989

[54] PULSED TUNABLE SOLID STATE LASER

[75] Inventors: Bertram C. Johnson, Sunnyvale; John C. DiFonzo, San Mateo; Richard L. Herbst, Palo Alto, all of Calif.

[73] Assignee: Spectra-Physics, San Jose, Calif.

[21] Appl. No.: 231,726

[22] Filed: Aug. 12, 1988

[51] Int. Cl.[4] .................................................. H01S 3/10
[52] U.S. Cl. ...................................... 372/20; 372/100; 372/102
[58] Field of Search .................. 372/20, 101, 100, 102, 372/39, 40, 41; 350/162.17, 162.20, 162.22, 162.23, 162.24, 420–424

[56] References Cited

U.S. PATENT DOCUMENTS

| | | | |
|---|---|---|---|
| 3,868,590 | 2/1975 | Itzkan et al. | 372/102 |
| 4,127,828 | 11/1978 | Klauminzer | 372/102 |
| 4,255,718 | 3/1981 | Herbst | 372/102 |
| 4,464,759 | 8/1984 | Haus et al. | 372/20 |
| 4,589,115 | 5/1986 | Burnham et al. | 372/20 |
| 4,656,641 | 4/1987 | Scifres et al. | 350/420 |
| 4,696,012 | 9/1987 | Harshaw | 372/102 |

OTHER PUBLICATIONS

Lotem et al.; "Double Wavelength Laser"; Appl. Phys. Lett., vol. 27, No. 6; Sept. 15, 1975; pp. 344–346.
Duarte et al.; "A double-Prism ... Dye Lasers"; Optics Communications, vol. 35, No. 1; October, 1980; pp. 100–104.
"Tunable Solid-State Lasers Targeted for a Variety of Applications"; Peter F. Moulton, Laser Focus/Electro-Optics, Aug., 1987.

Primary Examiner—Frank Gonzalez
Attorney, Agent, or Firm—Fliesler, Dubb, Meyer & Lovejoy

[57] ABSTRACT

A tunable solid state laser oscillator with very narrow spectral line width for pulsed output comprises a solid state laser medium that generates a laser beam along a resonant path, a beam expander, such as a prism beam expander or cylindrical optic, and a grating mounted with an adjustable angle of incidence with respect to the laser beam. By adjusting the angle of incidence of the beam on the grating, the laser output wavelength is tuned. Further, the reflectivity of the grating provides very narrow spectral line width for oscillation in the laser over the entire tuning range.

35 Claims, 2 Drawing Sheets

PULSED TUNABLE SOLID STATE LASER

BACKGROUND OF THE INVENTION

1. Field of the Invention

The present invention relates to tunable solid state lasers, and particularly to pulsed solid state lasers tunable over a wide spectral range with a narrow spectral line width in the output.

2. Description of Related Art

Tunable solid state lasers are being considered for a variety of applications, from remote sensing to medicine. See Peter F. Moulton, *"Tunable Solid State Lasers Targeted for a Variety of Applications,"* LASER FOCUS/ELECTRO-OPTICS, August 1987, pp. 56-69. These applications for tunable lasers require a large tunable range, a long, useful life for the medium, and limited operator interaction during tuning.

Before tunable solid state lasers were targeted for applications requiring a broad spectral range, designers relied on dye lasers for such applications. However, dye lasers require use of liquid flowing dyes as the laser medium. Further, the tunable range of a specific dye is much smaller than the ranges of known tunable solid state media. Thus, when a tunable laser is required to cover a wide spectral range, the operator must change from dye to dye. Dye changing is a complicated procedure, making dye lasers inappropriate for many applications. In addition, dyes are typically toxic chemicals or solvents that are difficult to handle. Further, dyes used in tunable dye lasers usually have a short useful life and thus the dye needs to be changed even for applications having relatively narrow spectral requirements.

A prior art dye laser is disclosed in U.S. Pat. No. 4,255,718 entitled TRANSVERSELY PUMPED DYE LASER HAVING IMPROVED CONVERSION EFFICIENCY; invented by Richard L. Herbst.

Dye lasers are further typified by their application as laser amplifiers because of the very high gain of the dye medium. Accordingly, the internal energy of a dye laser is much lower than is typically encountered in solid state media that are lower gain and operate in the oscillation mode more readily. The control of line width in dye lasers has been demonstrated using gratings and beam expanders as disclosed in the Herbst reference cited above. However, because of the high gain of dye media, beam expansion on the order of 25 to 50 is required to achieve narrow linewidth operation, while simultaneously preventing damage to the gratings for dye laser applications. One would not expect, therefore, that a grating in combination with such a beam expander would be an operable means for assuring a narrow line width in the output of a solid state pulsed tunable laser used in an oscillator mode.

Using solid state media, it is desirable to have a narrow spectral line width. Prior art systems have been demonstrated that generate a 1 nanometer spectral width using injection seeding according to the Moulton article cited above. However, for many applications, it is desirable to have a much narrower spectral line width for a pulsed tunable solid state laser.

SUMMARY OF THE INVENTION

The present invention provides a tunable solid state laser with very narrow spectral line width. The invention comprises a solid state laser medium that generates a laser beam along a resonant path. A means is mounted along the resonant path for reflecting a tunable component of the laser beam back along the resonant path to the solid state medium. This means for reflecting a tunable component includes a beam expander, such as a prism beam expander or cylindrical telescope, and a grating mounted with an adjustable angle of incidence of the laser beam. By adjusting the angle of incidence of the beam on the grating, the laser output wavelength is tuned. Further, the reflectivity of the grating provides very narrow spectral line width for oscillation in the laser. cl BRIEF DESCRIPTION OF THE DRAWINGS FIG. 1 is a simplified block diagram of a laser according to the present invention.

DESCRIPTION OF THE PREFERRED EMBODIMENT

The detailed description of the preferred embodiment is provided. With respect to FIG. 1, a simplified description of the present invention is provided. With respect to FIGS. 2 and 3, a specific embodiment is described.

Figure 1:
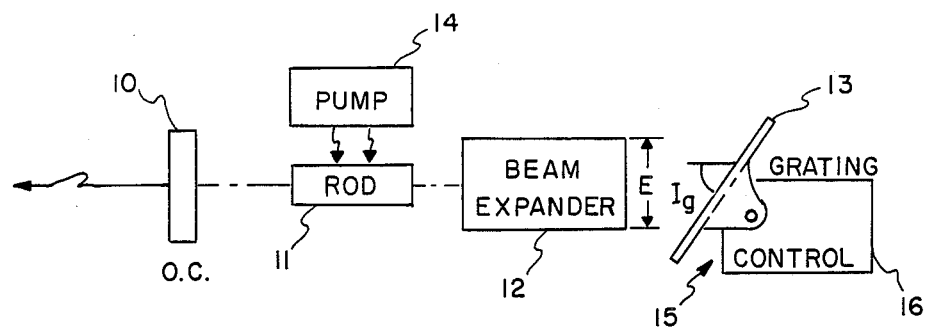

FIG. 1 is a simplified block diagram of a laser including an output coupler 10, a solid state laser medium 11, a beam expander 12 and a grating 13. The solid state medium 11 is a rod of active material which is excited by a laser pump 14. The grating 13 is mounted on a gimbal by which the angle of incidence $I_g$ on the grating can be adjusted. A control mechanism 16, such as a precision servo or a handoperated tuner using gear reduction for precise control, allows precise control of $I_g$ and therefore, precise control of tuning the frequency of the laser beam. The grating 13 can be a 600 line/mm. Littrow grating, or other grating adapted for reflection of light. Holographic gratings and other types of gratings can be adapted to this use, as is known in the art. The grooves in the grating 13 are parallel, and for FIG. 1, would extend perpendicular to the drawing.

The beam expander 12 operates by expanding the beam in the direction (indicated by arrows E) perpendicular to the grooves so that the beam is incident on a larger number of lines in the grating, providing for dispersion of the energy incident on the grating. The beam expander is preferably a prism beam expander as described with reference to FIG. 3. Alternative systems may include a cylindrical Galilean telescope, a Cassegrainian expander using cylindrical mirrors, off-axis cylindrical mirrors, or other combinations of optic elements that produce the expansion.

Suitable materials for the solid state medium 11 include titanium-doped sapphire (Ti:Al$_2$O$_3$), alexandrite, chromium-doped crystalline hosts or glass, cobalt-doped magnesium fluoride (Co:MgF$_2$), chromium-activated forsterite (Cr$^3$:Mg$_2$SiO$_4$) and other solid state media which are tunable over a wide range. The pump 14 can be adapted as is known in the art, to a specific medium and power outputs desired. Likewise, the beam expander 12 can be designed to optimize power outputs without damage to the grating 13.

The pump -14 can be, for instance, a xenon flashlamp, an optimized laser pumping system that supplies the pumping beam along a resonant axis of the laser cavity, or other pumping systems.

Figure 2:
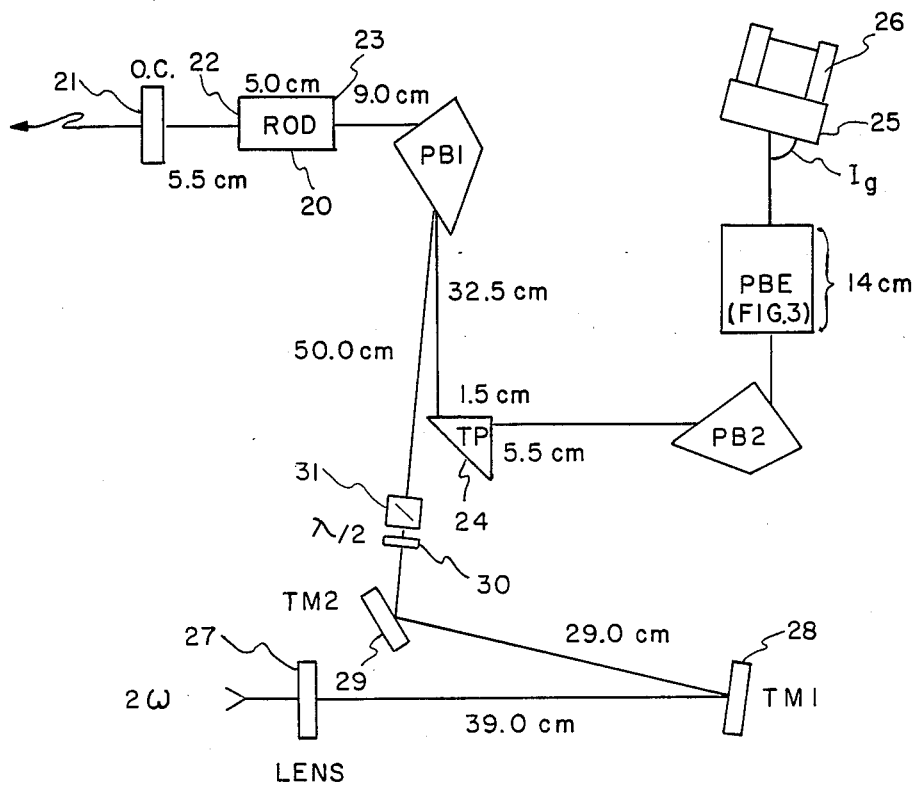
FIG. 2 is a diagram of a prototype laser according to the present invention.
Figure 3:
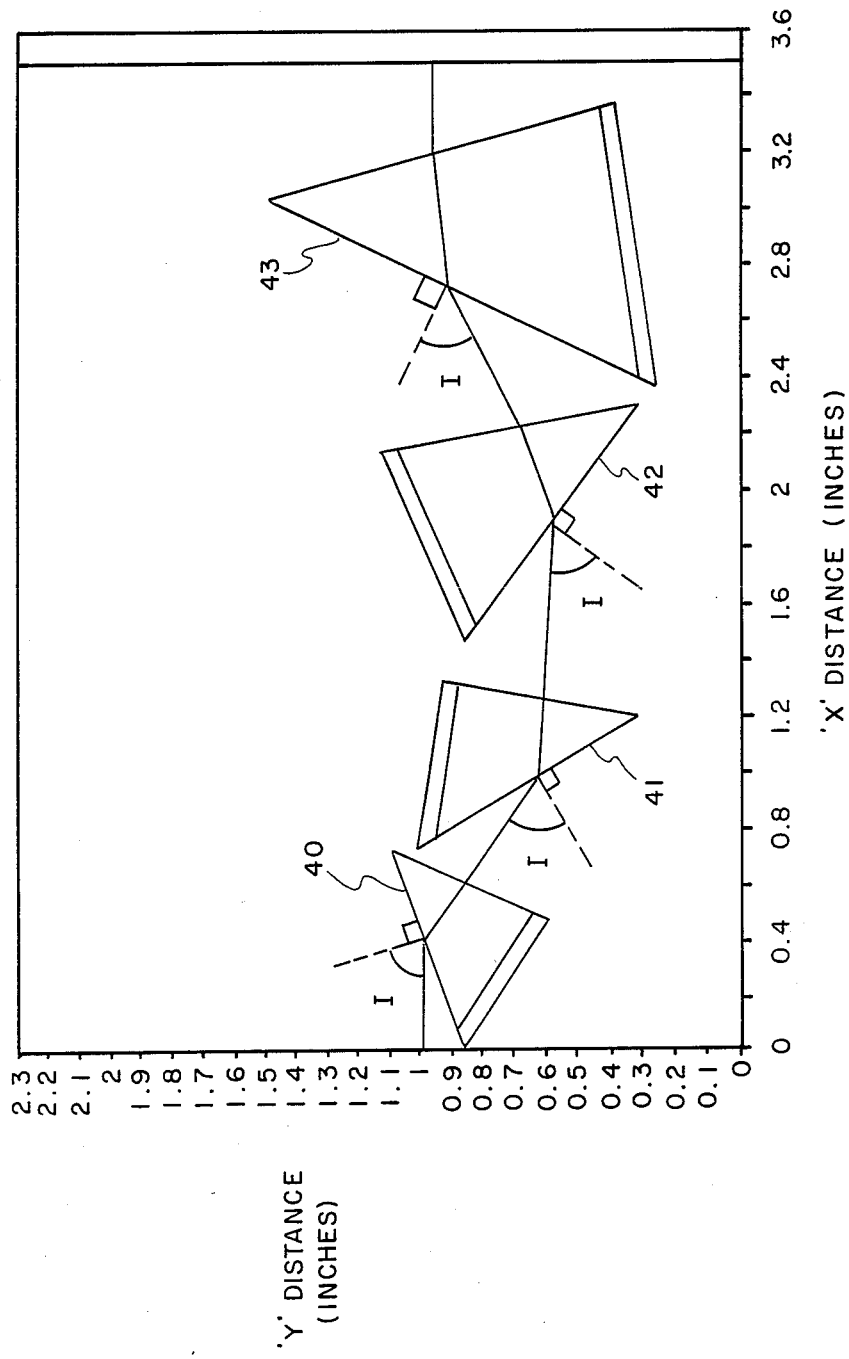
FIG. 3 is a diagram of the prism beam expander used in the system of FIG. 2.

FIG. 2 is a diagram of an experimental system using titanium-doped sapphire at 0.1 or 0.3 per cent titanium per unit volume, formed in a 5 cm. rod 20. The laser includes an output coupler 21, 5.5 cm. from the first side 22 of the rod 20. From the second side 23 of the rod 20, a Pellin-Broca prism PB1, is placed at 9 cm. Thirty two and one half centimeters from the PB1 is a turning prism 24. The beam passes 1.5 cm. through the turning prism, and spaced 5.5 cm. from the turning prism is a second Pellin-Broca prism PB2. The beam output from PB2 passes through a prism beam expander as shown in FIG. 3, which is 14 cm. in length. The output of the prism beam expander is supplied at an incident angle $I_g$ on grating 25. The grating 25 is a 600 line/mm. Littrow grating mounted on a gimbal 26 by which the angle $I_g$ can be precisely controlled.

The pumping beam is supplied through a convex lens 27 having a two meter focal length. Thirty nine centimeters from the convex lens 27 is a turning mirror 28. Twenty nine centimeters from the turning mirror 28 is a second turning mirror 29. The pumping beam reflects from turning mirror 29 and passes through the half-wave plate 30 and polarizer 31 to the Pellin-Broca prism PB1 where it is combined with the resonant beam and supplied to the rod 20. The half-wave plate 30 and polarizer 31 act as an attenuator by which the power of the pumping beam can be controlled. The pumping radiation is a second harmonic output of a Nd:YAG laser (frequency doubled) at 532 nanometers.

FIG. 3 is a diagram of the prism beam expander in the system shown in FIG. 2. The prism beam expander includes four prisms each with an apex angle of 45 degrees formed of fused silica. The prisms are arranged substantially as shown in FIG. 3 with the incident angle of prism $40 = 71.28°$, the incident angle of prism $41 = 67.55°$, the incident angle of prism $42 = 59.30°$ and the incident angle of prism $43 = 52.76°$, where the incident angles are measured by deviation from perpendicular to the face of the prism on which the light is incident. The magnification of the prism beam expander shown in FIG. 3 is ten times in the Y direction on the drawing.

Use of a prism beam expander is preferred over that of a cylindrical lens because of the inherent wavelength dispersion in any cylindrical lens. The prism beam expander can be adapted to provide precise expansion of the beam while compensating for dispersion in the optic materials used to create the expander.

The beam expansion for systems using solid state media according to the present invention is expected to be satisfactory over a range of five to ten times expansion.

In the system illustrated in FIG. 2, it is found that output energy of tens of millijoules per pulse over a wide range of tuning frequencies with very narrow line widths is available. In fact, it has been demonstrated that line widths less than five-tenths and down to one-tenth of a wave number are available according to the present invention, for solid state laser media tunable over a very wide range.

The present invention is particularly applicable to rod lasers operating as high power oscillator lasers in a pulsed mode.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. An apparatus, comprising:
   a solid state laser medium, coupled with an energy source, for amplifying a beam of coherent radiation along an optical path;
   a beam expander mounted along the optical path, having a first side facing the laser medium and a second side, for expanding the beam incident at the first side and transmitted out the second side in a first direction perpendicular to the optical path and for focusing a beam incident at the second side and transmitted out the first side;
   a grating, mounted along the optical path facing the second side of the beam expander at an adjustable angle of incidence for reflecting the expanded beam incident on the grating, the grooves in the grating being essentially perpendicular to the first direction and to the optical path; and
   means, connected to the grating, for adjusting the adjustable angle of incidence.

2. The apparatus of claim 1, wherein the beam expander comprises a cylindrical telescope.

3. The apparatus of claim 1, wherein the beam expander comprises a prism beam expander.

4. The apparatus of claim 1, wherein the beam expander comprises a Cassegrainian expander.

5. The apparatus of claim 1, wherein the beam expander expands the beam from 5 to 10 times in the first direction.

6. The apparatus of claim 1, wherein the solid state laser medium comprises a chromium-doped crystalline host.

7. The apparatus of claim 1, wherein the solid state laser medium comprises Ti:Al$_2$O$_3$.

8. The apparatus of claim 1, wherein the solid state laser medium comprises a chromium-doped glass.

9. The apparatus of claim 1, wherein the solid state laser medium comprises Co:MgF$_2$.

10. The apparatus of claim 1, wherein the solid state laser medium comprises alexandrite.

11. The apparatus of claim 1, wherein the solid state laser medium comprises Cr$^3$:Mg$_2$SiO$_4$ (chromium-activated forsterite).

12. A tunable laser, comprising:
    an energy source;
    a resonant cavity having an output coupler, the resonant cavity defining a resonant path;
    a solid state laser medium, within the resonant cavity and coupled with the energy source, for generating a laser beam along the resonant path; wherein the resonant cavity includes:
    a beam expander mounted along the resonant path, having a first side facing the laser medium and a second side, for expanding the beam incident at the first side and transmitted out the second side in a first direction perpendicular to the resonant path and for focusing a beam incident at the second side and transmitted out the first side;

a grating, mounted along the resonant path facing the second side of the beam expander at an adjustable angle of incidence, for reflecting the expanded beam incident on the grating along the resonant path, the grooves in the grating being essentially perpendicular to the first direction and to the resonant path; and a servo-mechanism mounted with the grating for adjusting the adjustable angle of incidence.

13. The apparatus of claim 12, wherein the beam expander comprises a cylindrical telescope.

14. The apparatus of claim 12, wherein the beam expander comprises a Cassegrainian expander.

15. The apparatus of claim 12, wherein the beam expander comprises a prism beam expander.

16. The apparatus of claim 12, wherein the beam expander expands the beam from 5 to 10 times in the first direction.

17. The apparatus of claim 12, wherein the solid state laser medium comprises a chromium-doped crystalline host.

18. The apparatus of claim 12, wherein the solid state laser medium comprises $Ti:Al_2O_3$.

19. The apparatus of claim 12, wherein the solid state laser medium comprises a chromium-doped glass.

20. The apparatus of claim 12, wherein the solid state laser medium comprises $Co:MgF_2$.

21. The apparatus of claim 12, wherein the solid state laser medium comprises alexandrite.

22. The apparatus of claim 12, wherein the solid state laser medium comprises $Cr^3:Mg_2SiO_4$.

23. An apparatus, comprising:
a solid state laser medium, coupled with an energy source, for amplifying a beam of coherent radiation propagating along an optical path;

means, mounted along the optical path and having a first side facing the laser medium, for reflecting a component of the beam incident on the first side along the optical path, the component having a tunable frequency with a spectral line width of less than 0.5 wave numbers; and means, mounted with the means for reflecting, for adjusting the means for reflecting to set the tunable frequency of the component.

24. The apparatus of claim 23, wherein the means for reflecting comprises a beam expander and a grating mounted along the resonant path, the grating having an adjustable angle of incidence with respect to the resonant path.

25. The apparatus of claim 24, wherein the means for adjusting comprises a precision servo-mechanism coupled to the grating for controlling the adjustable angle of incidence.

26. The apparatus of claim 24, wherein the beam expander comprises a cylindrical telescope.

27. The apparatus of claim 24, wherein the beam expander comprises a prism beam expander.

28. The apparatus of claim 24, wherein the beam expander comprises a Cassegrainian expander.

29. The apparatus of claim 24, wherein the beam expander expands the beam from 5 to 10 times in the first direction.

30. The apparatus of claim 23, wherein the solid state laser medium comprises a chromium-doped crystalline host.

31. The apparatus of claim 23, wherein the solid state laser medium comprises $Ti:Al_2O_3$.

32. The apparatus of claim 23, wherein the solid state laser medium comprises chromium-doped glass.

33. The apparatus of claim 23, wherein the solid state laser medium comprises $Co:MgF_2$.

34. The apparatus of claim 23, wherein the solid state laser medium comprises alexandrite.

35. The apparatus of claim 23, wherein the solid state laser medium comprises $Cr^3:Mg_2SiO_4$ (chromium-activated forsterite).

* * * * *